(12) United States Patent
Luu et al.

(10) Patent No.: US 12,735,976 B2
(45) Date of Patent: Sep. 15, 2026

(54) ADVANCED OPTICAL IMAGING OF TUBULARS

(71) Applicant: DarkVision Technologies Inc., North Vancouver (CA)

(72) Inventors: Timothy Luu, North Vancouver (CA); Graham Manders, North Vancouver (CA); Damian Nesbitt, Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 0 days.

(21) Appl. No.: 18/939,565

(22) Filed: Nov. 7, 2024

(65) Prior Publication Data

US 2025/0059877 A1 Feb. 20, 2025

Related U.S. Application Data

(63) Continuation of application No. 18/119,836, filed on Mar. 10, 2023, now Pat. No. 12,378,870.

(30) Foreign Application Priority Data

May 6, 2022 (GB) ..................................... 2206695

(51) Int. Cl.
*E21B 47/002* (2012.01)
*H04N 23/50* (2023.01)

(52) U.S. Cl.
CPC ....... *E21B 47/0025* (2020.05); *H04N 23/555* (2023.01)

(58) Field of Classification Search
None
See application file for complete search history.

(56) References Cited

U.S. PATENT DOCUMENTS

| | | | |
|---|---|---|---|
| 5,519,543 A | 5/1996 | Olsson | |
| 9,765,609 B2 | 9/2017 | Chemali | |
| 10,545,330 B2 | 1/2020 | Thursby et al. | |
| 10,815,767 B2 | 10/2020 | Thursby et al. | |
| 2009/0102961 A1 | 4/2009 | Uzawa | |
| 2016/0259237 A1 | 9/2016 | Harris | |
| 2017/0101862 A1* | 4/2017 | Meyers | G03B 37/005 |
| 2018/0068266 A1 | 3/2018 | Kirmani et al. | |
| 2020/0055196 A1* | 2/2020 | Halpenny | E21B 47/002 |

(Continued)

FOREIGN PATENT DOCUMENTS

| | | |
|---|---|---|
| CN | 213987008 U | 8/2021 |
| EP | 0846840 A2 | 6/1998 |

(Continued)

OTHER PUBLICATIONS

Final office action received for U.S. Appl. No. 18/119,836, mailed on Oct. 24, 2024, 17 pages.

(Continued)

*Primary Examiner* — Eileen M Adams

(57) ABSTRACT

A device and method used to inspect wellbores, cased or uncased using cameras and a phased array ultrasound transducer. The optical and ultrasound images are stored on the device and then registered and analyzed together. The present device overcomes the deficiencies currently experience by downhole camera operators, such as poor scale and lack of volumetric perspective.

21 Claims, 14 Drawing Sheets

(56) References Cited

U.S. PATENT DOCUMENTS

| | | | | |
|---|---|---|---|---|
| 2021/0068782 | A1* | 3/2021 | Caluser ................ | A61B 8/4245 |
| 2021/0087920 | A1 | 3/2021 | Scott et al. | |
| 2021/0140305 | A1 | 5/2021 | Steinsiek | |
| 2022/0313208 | A1* | 10/2022 | True ..................... | A61B 8/4416 |

FOREIGN PATENT DOCUMENTS

| | | | |
|---|---|---|---|
| EP | 2831671 | A2 | 2/2015 |
| EP | 3096116 | A1 | 11/2016 |
| GB | 2293513 | A | 3/1996 |
| GB | 2598355 | A | 3/2022 |
| KR | 102299127 | B1 | 9/2021 |
| WO | 0206631 | A1 | 1/2002 |
| WO | 2007113556 | A1 | 10/2007 |

OTHER PUBLICATIONS

Jia, T, et al., "Depth Measurement Based on Infrared Coded Structured Light", Hindawi Publishing Corporation Journal of Sensors, vol. 2014, Article ID 852621, 2014, pp. 1-8.

Non-Final office action received for U.S. Appl. No. 18/119,836, mailed on Jun. 17, 2024, 12 pages.

* cited by examiner

ADVANCED OPTICAL IMAGING OF TUBULARS

TECHNICAL FIELD

The invention relates generally to inspection of fluid-carrying tubular, in particular, optical imaging of wellbores and pipelines.

BACKGROUND

Fluid carrying conduits, such as pipelines, downhole casings and wellbores, are regularly inspected for defects in the conduits or to image features on its surface. This allows operators to identify leaks, corrosion, couplings, perforations, and dents. Due to the typically murky nature of the fluid, ultrasound sensors are clearly the better choice for such inspections. The ultrasound waves can not only penetrate past the particulate in the fluid, they can also provide depth data into the conduit itself. Thus, ultrasound provides excellent 3D images of the conduit.

However, some have stubbornly tried to use cameras because of the intuitive nature of the images to operators. This usually requires pumping clear fluid between camera and the casing and illuminating the surface. Only 2D images are possible with camera and even those tend to be skewed due to the fisheye lenses used to capture a 360° surround image. Scale is another problem as features that are small and close look like those larger and further away. Sadly, some imaging tools use physical rulers within the Field of View (FoV) to indicate some absolute scale, which then obfuscate the feature being imaged.

Existing downhole camera tool such as EP2831671 "Camera Assembly" discloses how it is known to mount a camera within a vacuum flask housing to protect the image sensor from the high temperatures. However, these systems provide poor image quality.

US20210087920 A1 "Image correction methods for downhole inspection tools" discloses how problems with eccentricity means that the distance to the pipe and angle of the lens are not known, which leads to challenges with interpretation and determining dimension of features in the conduit.

U.S. Pat. No. 10,545,330 "Inspection Assembly" discloses how systems with a wide-angle lens, there is inadequate illumination of the entire field of view. The periphery of the image tends to be under exposed and the central portion of the image tends to be over exposed.

U.S. Pat. No. 10,815,767 "Inspection Assembly Viewport" discloses how a wide-angle camera at an end of a tool is highly distorted. Optical compression near the edges of the image results in a low resolution 360° view. Sideview cameras that must be rotated has a number of disadvantages: the motor may fail while the tool is deployed downhole; the 360° view capturing a series of images is a slow process that can only be practically implemented over a small area; and for inspection tools on memory only there is no ability to rotate the camera. This solution is, therefore, not possible to implement in inspection tools deployed on slickline cable. For tools having a plurality of cameras located around the circumference of the tool. This is a time-consuming process and one that can only be practically implemented over a small area. Furthermore, it is difficult to obtain images with low enough distortion to enable accurate post processing.

SUMMARY

To address the numerous shortcomings of existing downhole cameras, tools and methods are provided that improve the lighting and the optical path from the camera to the target.

In accordance with a first aspect of the invention there is provided a downhole imaging tool comprising: an elongate pressure vessel; illumination means; an optical imaging sensor; and a memory for storing images from the optical sensor; a telecentric lens optically coupled to the imaging sensor and optically directed outwards from the pressure vessel.

An optical path from the imaging sensor may be directed laterally outwards from the pressure vessel to image a casing of a wellbore.

The tool may comprise a periscope lens optically coupled to the telecentric lens to image laterally from the pressure vessel.

The tool may comprise a plurality of said optical imaging sensors and respective telecentric lenses arranged to capture different perspectives of the wellbore.

The plurality of optical imaging sensors and telecentric lenses may be spread out azimuthally with respect to the elongate pressure vessel.

The plurality of optical imaging sensors and telecentric lenses may be arranged within the pressure vessel axially offset and partly azimuthally overlapping.

In accordance with a second aspect of the invention there is provided a method of imaging a wellbore using the imaging tool of claim 1, comprising: deploying the tool into the wellbore; capturing images of the wellbore using the optical imaging sensor coupled to the telecentric lens; and determining dimensions of a wellbore feature from the distance between pixels of that feature in the captured image.

The method may combine images captured from a plurality of said optical imaging sensors and respective telecentric lenses to create a 2D image band of the wellbore laterally surrounding the tool.

The optical imaging sensors may be focused forward-facing of the pressure vessel to capture obstructions within the wellbore.

The method may measure the captured obstructions from said distance between pixels.

Determining dimensions of a wellbore feature may be computed without correcting for perspective between the camera and feature.

In accordance with a third aspect of the invention there is provided a downhole imaging tool comprising: an elongate pressure vessel; illumination means located within the vessel; an optical imaging sensor located within the vessel and having an optical axis aligned with the longitudinal axis of the vessel; a prism or mirror cooperating with the imaging sensor for redirecting the optical axis to capture images laterally outward of the vessel; and a memory for storing images from the optical sensor.

The tool may comprise a motor connector to the prism or mirror for spinning the prism or mirror about said longitudinal axis of the vessel.

The tool may comprise a transparent housing enclosing the prism or mirror. The mirror or prism may be provided in a periscope lens. The prism or mirror may be conically shaped. The prism or mirror may be flat along a surface for redirecting the optical axis. The optical imaging sensor may be a linescan camera.

The illumination means may surround said optical imaging sensor and cooperates with the prism or mirror to illuminate laterally outward.

In accordance with a fourth aspect of the invention there is provided a method of imaging a wellbore comprising the steps of: deploying an elongate pressure vessel through the wellbore; illuminating an area of the wellbore laterally outward from the vessel; imaging said area using an optical imaging sensor having an optical axis aligned with the longitudinal axis of the vessel, which optical axis is redirected toward said area by a prism or mirror; and storing images from the optical sensor in a memory of the tool.

The illumination means may comprise structured light, the method may comprise processing the stored image using parameters of the structure light to compute geometric properties of the wellbore.

The method may rotate said mirror or prism to sweep a 2D band of the wellbore for said imaging.

In accordance with a fifth aspect of the invention there is provided a downhole imaging tool comprising: an elongate housing; illumination means; a phased array ultrasound sensor; an optical imaging sensor with lens; and a memory for storing images from the ultrasound and optical sensors. Wherein the optical and ultrasound sensors are spaced apart within the housing and arranged to focus laterally outward from the housing.

The tool may comprise a computer processor and instructions for co-registering images from optical and ultrasonic sensors.

The optical and ultrasound sensors may be arranged to focus on substantially a same external location, radially outward from the housing In accordance with a sixth aspect of the invention there is provided a method for imaging an industrial component comprising: imaging an industrial component using an optical sensor and ultrasound sensor; receiving by a processor optical image data and ultrasound image data; registering the optical image data with the ultrasound image data; and rendering a 3D visualization of the component using the ultrasound image data for the visualization's depth information and using the optical image data for the visualization's surface information.

In accordance with a seventh aspect of the invention there is provided a downhole imaging tool comprising: an elongate pressure vessel; an activate illuminator; an optical imaging sensor; and a memory for storing images from the optical sensor, wherein the sensor and active illuminator are located within the vessel and facing an overlapping external location.

The active lighting and imaging tool may be facing radially outward from the housing. The active lighting and imaging tool may be facing forward facing from the housing.

The active lighting may comprise laser projection, pattern projection, pulsing light, or colour differences.

In accordance with an eighth aspect of the invention there is provided a downhole imaging tool comprising: an elongate housing; illumination means; at least one first optical imaging sensor; at least one second optical imaging sensor; and a memory for storing images from first and second optical sensors. Wherein the first and second imaging sensors are spaced apart on the housing and arranged to focus on substantially an overlapping external location.

In accordance with a ninth aspect of the invention there is provided a downhole imaging tool comprising: a pressure vessel; at least one first pulsing illumination means; at least one second pulsing illumination means; at least one optical imaging sensor; and a memory for storing images from the optical sensor, a controller arranged to alternate pulsing of the first and second illumination means and arranged to capture images using the imaging sensor during each of the alternate pulses. Wherein the first and second pulsing illumination means are spaced apart on the housing and arranged to illuminate a substantially overlapping external location from different perspectives, and wherein said optical imaging sensor is focused to capture said location.

Aspects of the invention may be combined to create even better downhole camera systems and image processing. These combinations provide more imaging information, resolution, redundancy and perspectives to visualize the well.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

DETAILED DESCRIPTION

With reference to the accompanying figures, devices and methods are disclosed for optical imaging of wellbores and downhole casings with improvements in illumination, image processing, camera and lens arrangements. These improvements may be combined synergistically to gain even more improvement over current systems.

Figure 1:
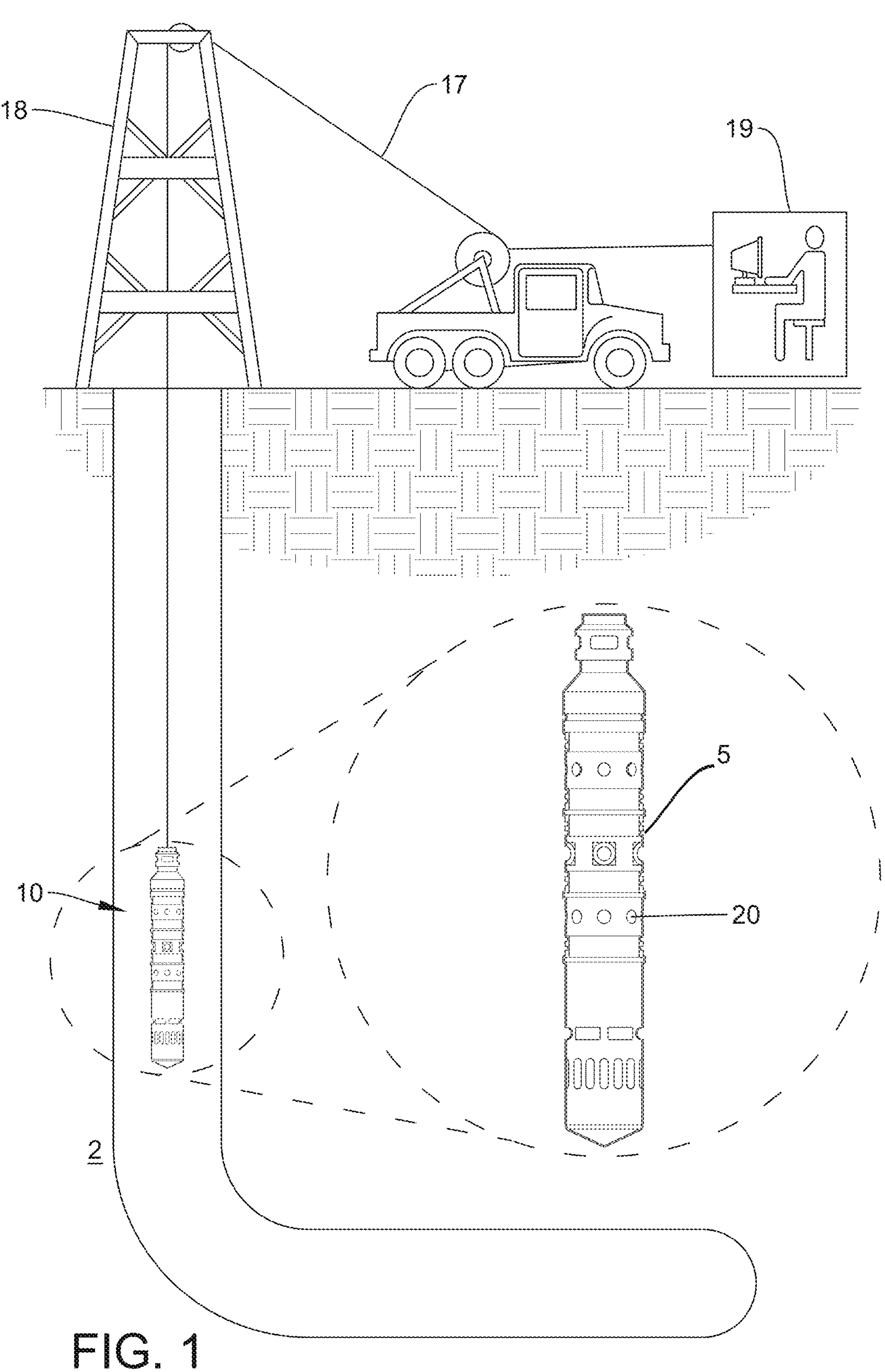
FIG. 1 is a cross-sectional view of an imaging device deployed in a wellbore in accordance with one embodiment of the invention.

As depicted in FIG. 1, boreholes and casings 2 may be inspected with an elongate tool 10 using optical sensors 5. Lighting 20 illuminates the areas of the borehole to be imaged, which may be in front of or lateral of the tool. The tool comprises a housing, designed as a pressure vessel, to hold and protect the delicate components therein from the corrosive, high-temperature, high-pressure environment.

Figure 2:
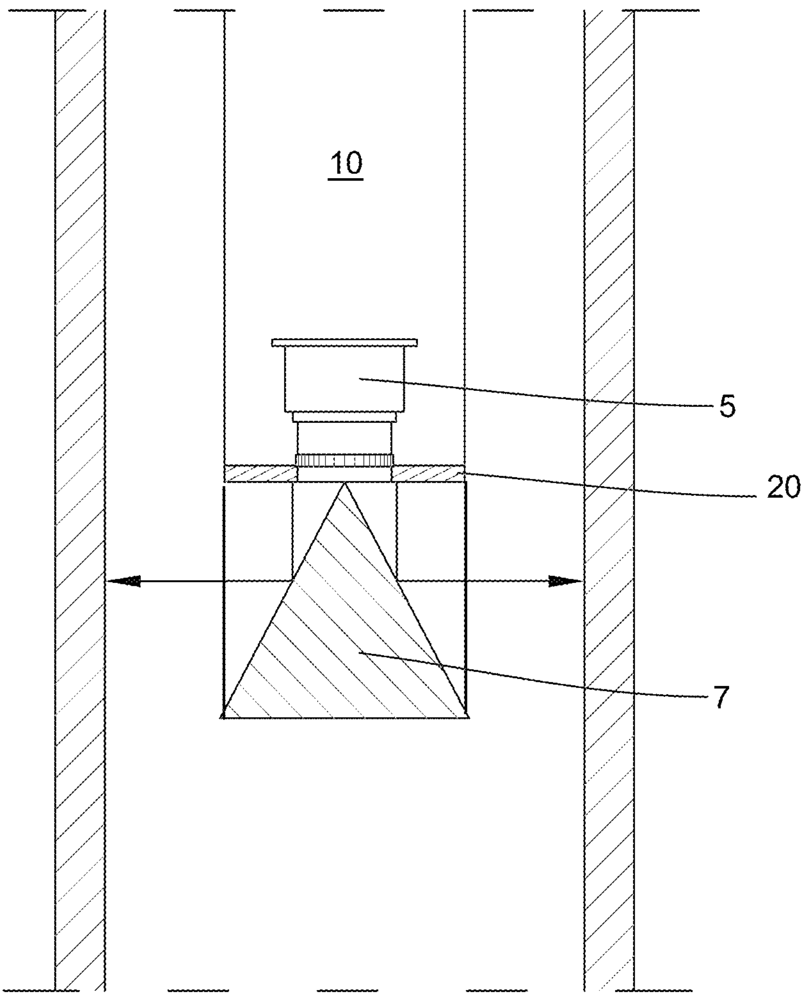
FIG. 2 is a cross-sectional view of an imaging device in a well with conical mirror.
Figure 3:
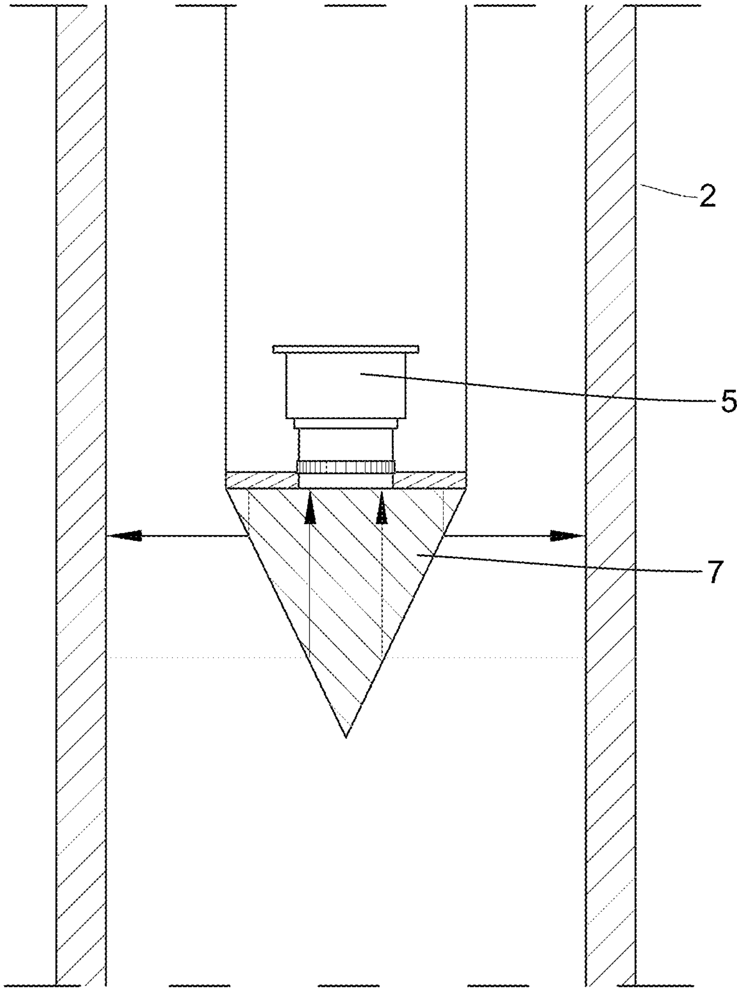
FIG. 3 is a cross-sectional view of an imaging device in a well with conical prism.
Figure 4:
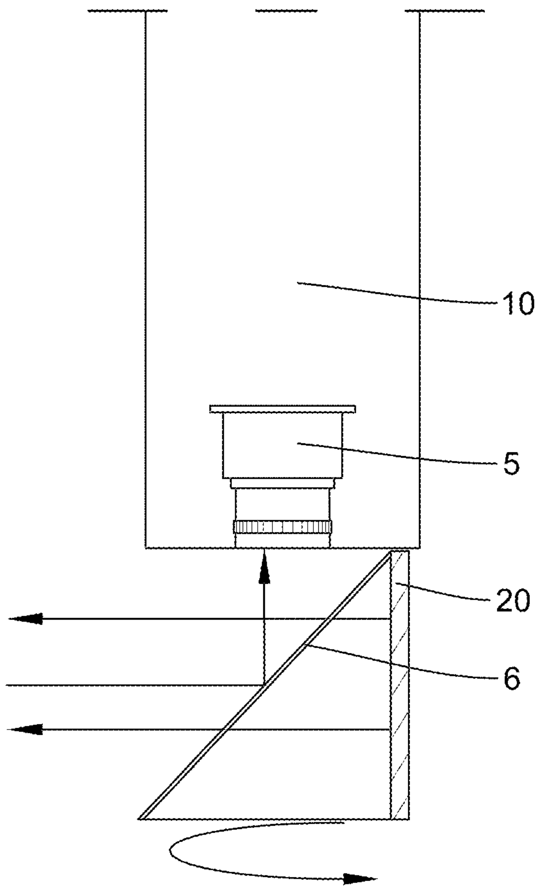
FIG. 4 is a cross-sectional view of an imaging device in a well with rotatable planar mirror.

The tool may have a single camera to image the wellbore, as exemplified by FIGS. 2, 3, and 4. Alternatively, the tool may have multiple cameras that combine image data to image the whole wellbore, as exemplified by FIGS. 5, 7, 8, and 9.

Operators at the well site 18 may move the tool through the borehole using a wireline 17 to log the borehole.

Redirecting the Optical Path

In certain arrangements, the camera cooperates with a prism or mirror to redirect the optical path laterally. This allows the camera to be protected within the pressure vessel without restricting the length of the optical path and components. The camera and its optical path and aligned with the longitudinal axis of the housing to face towards an end of the housing. So, while the diameter of the camera's sensor and electronics is limited to the narrow housing (e.g. 5-10 cms), the lenses can be axially stacked and spaced apart to achieve the desired focus and other optical properties. The prism or mirror thus allows the camera to image sideways.

As shown in FIG. 2, the camera, lens and lighting face towards the end of the housing, sometimes called forward facing. Conical mirror 7 cooperates with the optical path to redirect it laterally (i.e. radially) outwards of the housing so that the camera images the casing, instead of objects in front of the tool. The optical path is shown as reflecting 90° but the mirror cone angle may be reduced to capture slightly downhole. This oblique imaging is suited to capturing specular features in the casing surface.

Alternatively, as shown in FIG. 3, a prism may be used to redirect the camera optical path by refraction. Advantageously, a glass housing is not needed to support the prism.

The mirror or prism may be surrounded by a glass housing to support and protect it while allowing the light to pass. Thin metal rods may additionally be used to strengthen the mirror/prism support with minimal optical obstruction.

Using a conical mirror or prism with a flat imaging sensor does however have distortion problems, as pixels near the apex will capture a wider region of the casing (i.e. they will be stretched) compared to pixels near the outer edge of the cone. FIG. 4 illustrates a camera, e.g. a linescan camera, cooperating with a flat, axially-rotating mirror 6. A rotating flat prism may alternatively be used similar to FIG. 3.

As the mirror (or prism) is rotated, the camera sweeps out 360° and the axial line captures are stacked to image the casing in two dimensions. The rotation may be continuous to log a long section of tubular without interruption or controlled to image a specific location of interest.

As linescan cameras and associated circuitry are less commonly available than 2D cameras, it is possible to use a standard 2D camera and only use a row or similar subset of pixels for the aperture. The aperture may be a ring of pixels when cooperating with a conical prism/mirror or a line of pixels when cooperating with a flat prism/mirror. Although this 'wastes' certain pixels and may only capture a ring Field of View, the axial movement of the tool sweeps out the second dimension to complete a 2D capture of the casing. The aperture may be extended to neighboring pixels, where the distortion is minimal compared to the problematic extremes of the cone. Also, the extra pixels may be used to redundantly capture the casing for registration between frames.

In some embodiments, the camera may use monochrome sensors, because of their higher and wider band sensitivity. This may be particularly relevant in downhole applications where there is very little color information or where the intent is to capture mostly geometric information. Conversely, colour information may be useful to understand properties of corrosion, material build-up, and FISH.

Telecentric

In certain embodiments, telecentric lenses are used instead of conventional lenses. Telecentric lenses have no perspective distortion and makes it easy to measure downhole features such as perforations and 'fish'. Telecentric lenses are designed to have a constant magnification regardless of the feature's distance or location in the Field of View. This property is advantageous in downhole applications where feature measurement is critical and yet the casing diameter or distance to the casing changes. The measurements of a feature's dimension will be independent of where it is located. These systems tend to produce hard edges in images because the principle parallel rays do not capture features orthogonal to object plane. For example, the sides and radial flare of a perforation do not affect the observed diameter of the perforation, which would be the case with a conventional lens system.

Figure 10:
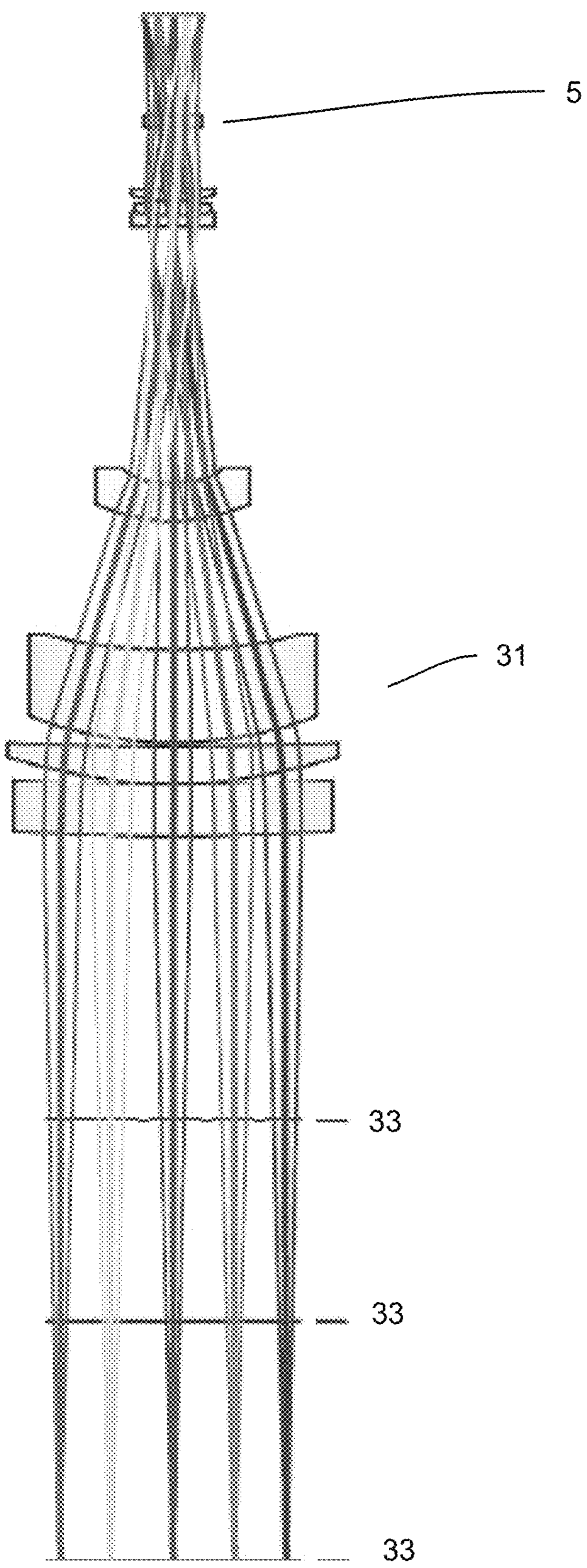
FIG. 10 is a side view of a telecentric lens.
Figure 11:
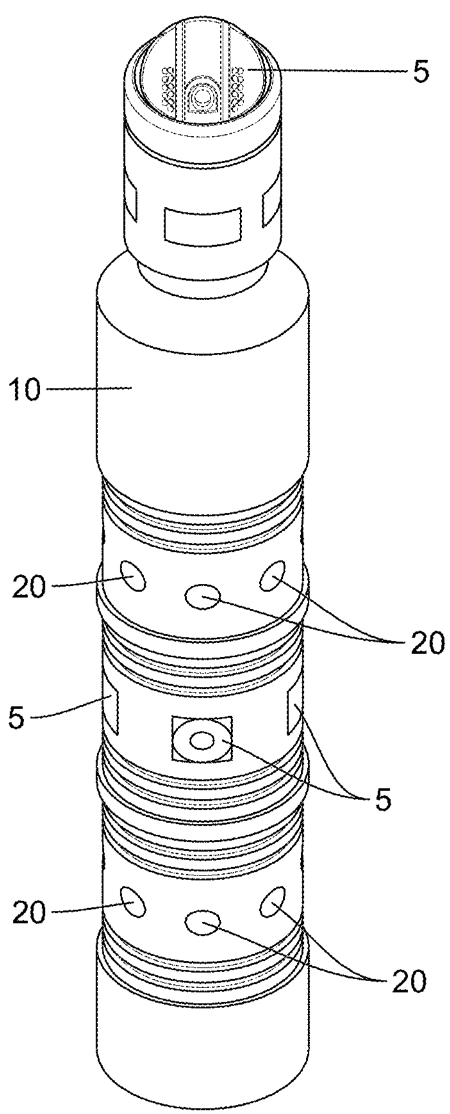
FIG. 11 is a perspective view of a rotatable camera at an end of a known imaging tool.
Figure 12:
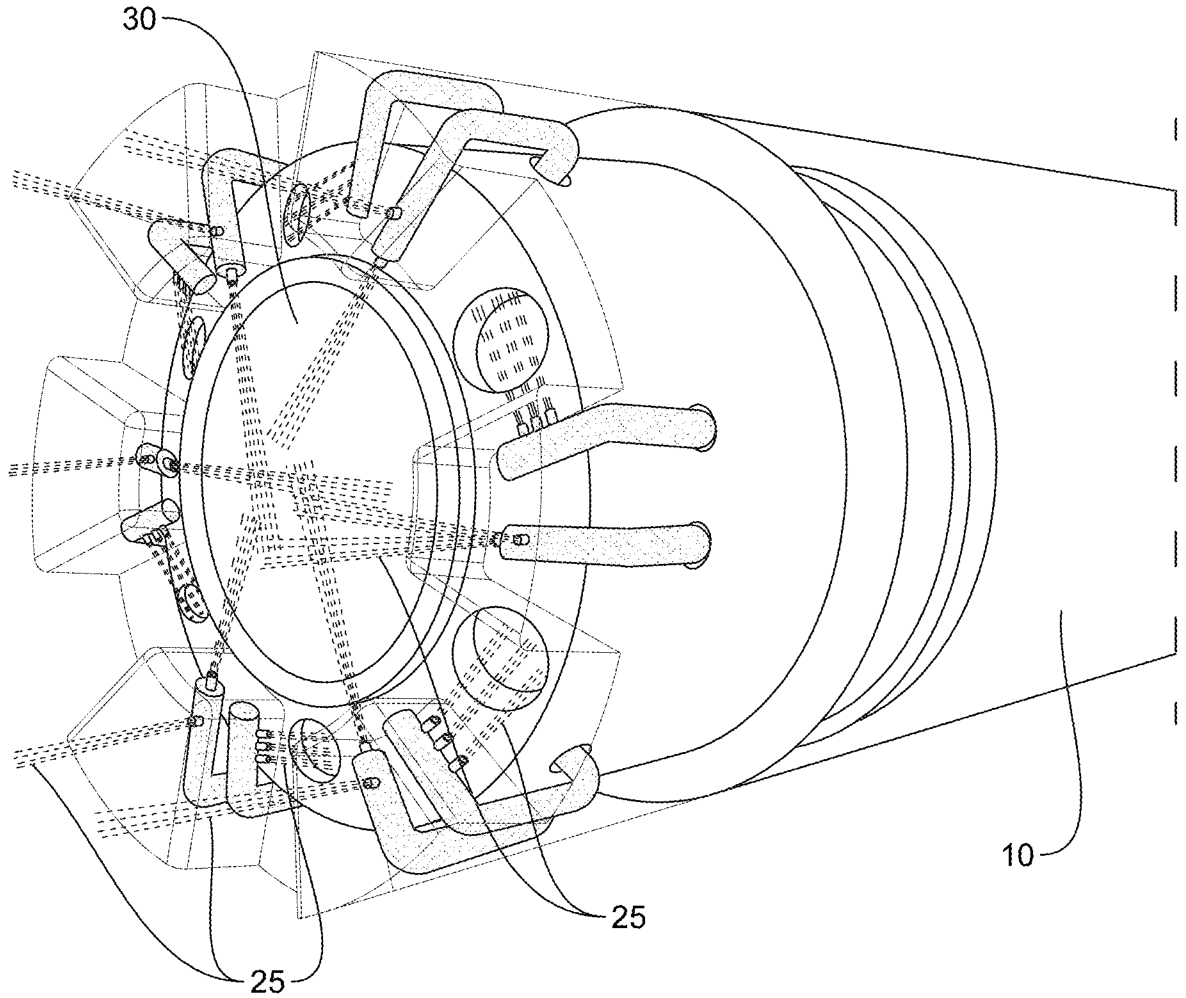
FIG. 12 is a perspective view of an imaging tool with clear fluid jets.
Figure 13:
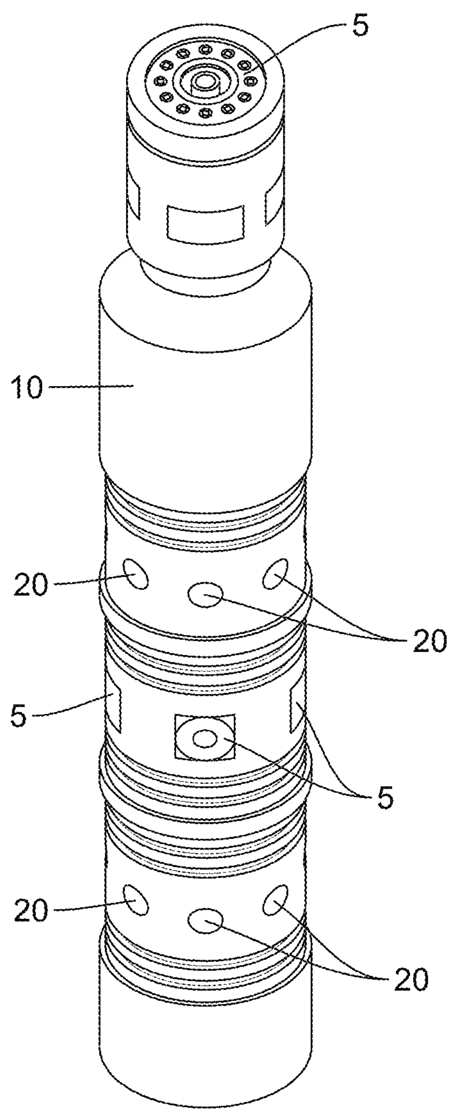
FIG. 13 is a perspective view of a tool having down-facing and radial-facing camera and according to known imaging tools.

As illustrated is FIG. 10, a telecentric lens comprises several lens elements that cooperate to project the object at any distance away from the device towards the camera's focal plane. Compared to the angular field of view of conventional downhole cameras, the present telecentric lens has a non-angular field of view. Thus, the lens does not suffer from parallax.

The telecentric lens may be arranged within the tool to provide a downhole Field of View (i.e. axial) to view FISH and determine their size without distortion or distance to the FISH being an issue. Alternatively, it may be arranged to provide a lateral Field of View to see surface features. Due to its size, the telecentric camera-lens may be axially aligned with the housing (i.e. vertical in the illustration of FIG. 9) having the final lens cooperating with a prism or mirror to view lateral fields. This is sometimes referred to as a periscope lens 32.

There may be several telecentric cameras located along the housing of a single tool. As the field of view is not very large, these cameras are distributed over the housing preferably with overlap to capture a full 360° slice of the tubular. That is, rows of radial-spread apart, laterally facing cameras may be stacked to fill in where a single row cannot see.

In an alternative embodiment, one or more telecentric cameras are combined with diverging (i.e. wide angle lens) cameras and arranged to redundantly capture at least some portion of the tubular. The diverging cameras capture the whole tubular and the telecentric camera(s) provide a scaling factor. In image processing and analysis, the computer scales the images from the diverging cameras using the known and fixed-size field of view from the telecentric camera(s). Features found in both images are used to register the overlapping images and then scale accordingly.

Light Patterns

Figure 8:
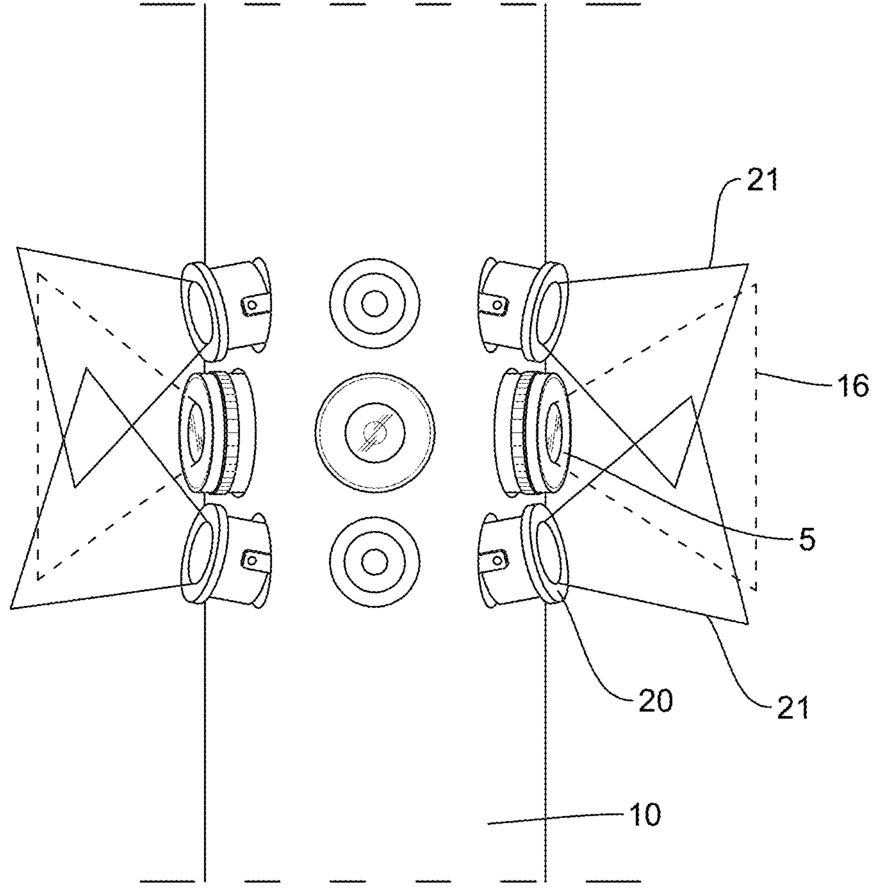
FIG. 8. is a side view of a stereoscopic illumination arrangement with camera and overlapping fields of view and illumination.
Figure 9:
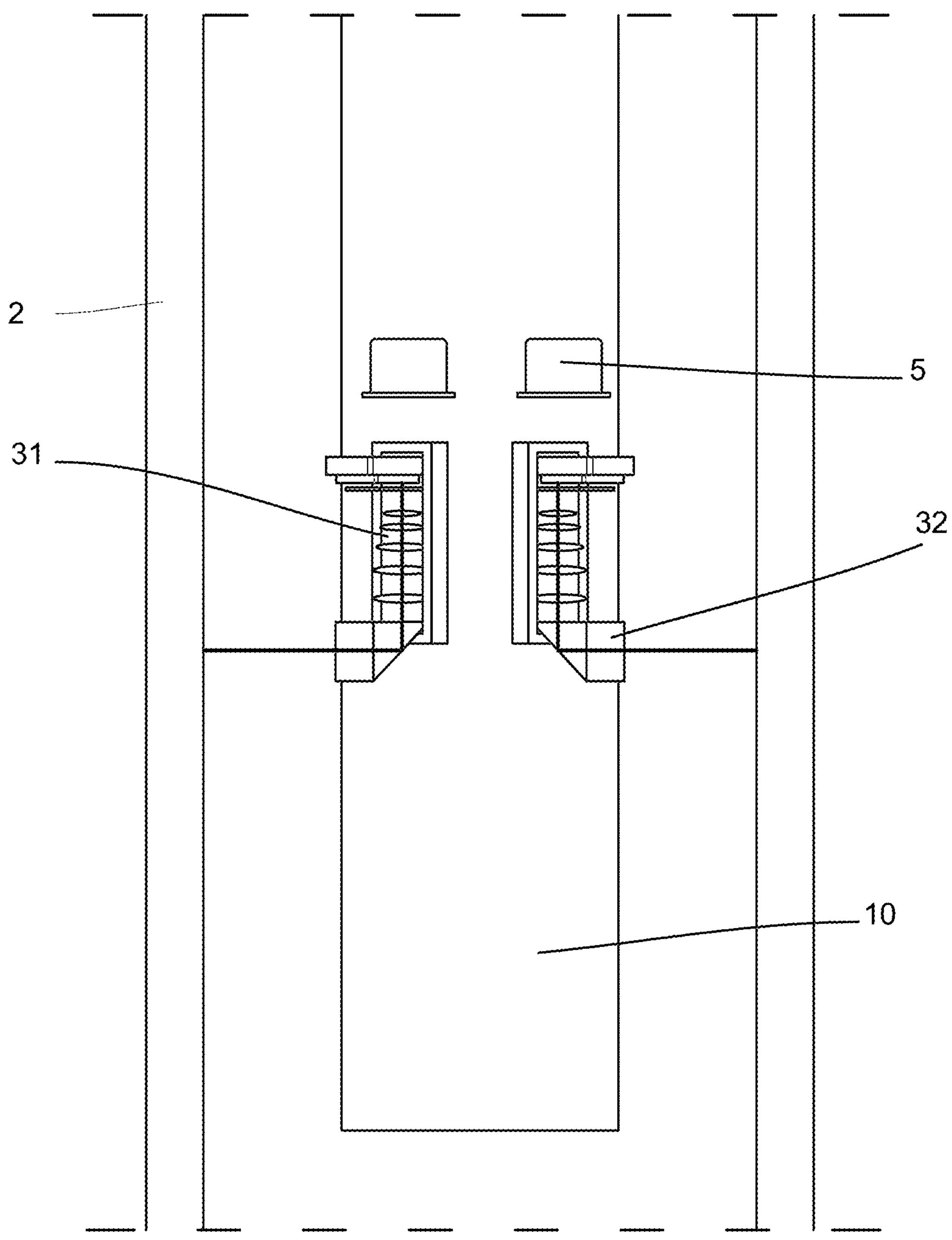
FIG. 9 is a side view of an imaging tool with a telescopic lens with periscope in a tubular.

Illumination is needed downhole to illuminate the area being imaged in an otherwise dark environment. This is typically provided by individual light points or ring of visible lights directed towards the casing. The casing area may be illuminated from above and below to increase the amount of lighting, as shown in FIG. 8. However simple illumination itself does not provide information and may create artefacts due to shadows and misalignment with the camera. In some embodiments, a light source 20 provides additional information to the illuminated area that is capture by the imaging sensor and processed to better measure the features.

The light source may provide structured illumination to provide 3D information or improve perspective. The light source may provide structured light, as colored bands, laser projection or pattern projection. The area illuminated by the structured light is preferably similar to or greater than the FOV and the resolution of the light's structure is preferably much finer than the features to be captured in the well.

Figure 6:
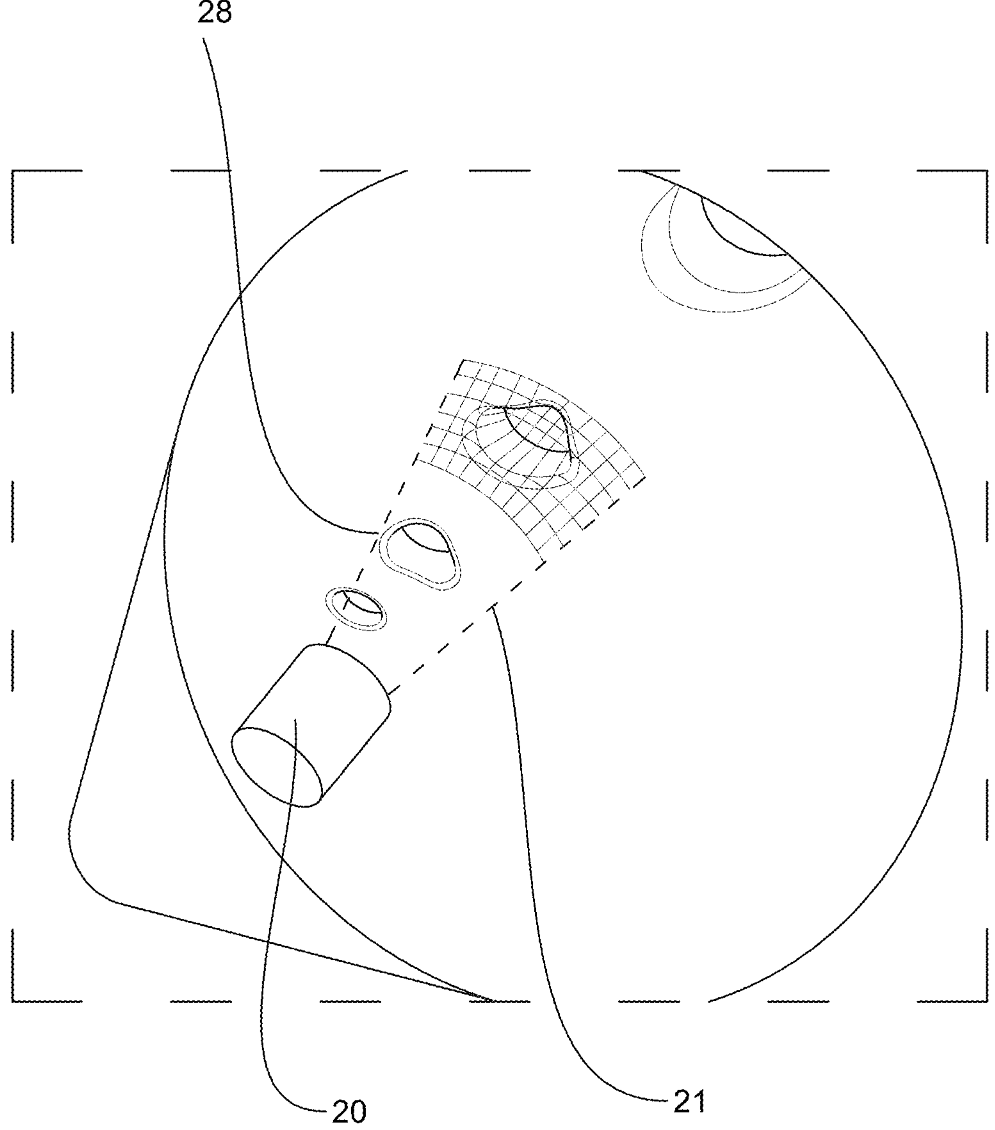
FIG. 6 is an illustration of a structured light source casting a grid of light on a curved surface.

As illustrated in FIG. 6, a 2D grid pattern is projected against the casing. The perforations 28 deflects the grid lines depending on depth of the local dips and bumps. The projector 20 as shown diverges, so the grid size increases for surfaces further away. Knowing the angular spread of the pattern from the projector, the image processing can calculate the distance to the casing from the size of the captured grid in the image. For fixed-grid projectors emitting collimated light, the grid size is constant.

Distortion in the axial or azimuthal direction of the wellbore image can be corrected for by observing the distortion in the grid. For example, a square grid projection is captured as rectangles elongated azimuthally due to the curvature in the casing. Unintended tilting of the imaging tool can cause distortion in the axial dimension. Through image processing, the captured image is then squashed (or stretched) accordingly, i.e. pixels are re-mapped to the expected square grid.

With reference to the example of FIG. 6, a perforation of 2-3 cm is illuminated by a grid spacing of 0.5 cm at the wall, in order to provide several sampling points from which to infer contours of the perforation. A finer spacing would help resolve smaller features and subtle contours. Depth of features are computed by additionally considering the radial displacement's effect on the grid, assuming distortion in the other dimensions are constant. Such computations are used in machine vision and are known in that art, including: Tong Jia, ZhongXuan Zhou, HaiHong Gao, "Depth Measurement Based on Infrared Coded Structured Light", Journal of Sensors, vol. 2014, Article ID 852621, 8 pages, 2014. https://doi.org/10.1155/2014/852621

Colored Lights

The structured light may be of a different wavelength than the unstructured general illumination, so that separate channels of the imaging sensor are sensitive to either the casing features or the pattern distortion, but not both. For example, the structured light may be red, while the general illumination is in the blue-green spectrum. The camera's red channel is therefore tuned to capture the pattern, while the other channels capture the casing's surface. The image processor scales the blue-green image and determines surface contours, using the red channel's grid pattern. The properties of the casing, such as diameter of a perforation, may be computed from the image of the distorted pattern or of the re-mapped pixels.

Lighting Angles

In FIGS. 2 and 3, a ring lighting source 20 surrounds the camera 5 and projects light through the prism or mirror 7 towards the target area. The ring may be tilted or the prism may be bifocal to adjust the Field of Illumination (FoI) to overlap the imaging Field of View (FoV), albeit slightly off-axis form the optical axis.

While oblique and off-axis lighting helps to reveal surface features and textures by their shadows and avoids glints, it affects measurement of certain features by softening their edges. For example, the sides of perforations and cracks under oblique lighting blurs the definition of the edge pixels. It also reduces the light returned to the imaging sensor, especially through a telecentric lenses. Thus, in certain embodiments, the illumination path and imaging path are co-axial/parallel.

FIG. 4 shows an embodiment with a lighting source 20 arranged to transmit light through the half-mirror 6 towards the target area in a direction substantially parallel to the reflected light back to the mirror then on to the camera. Preferable a collimator layer after an array of LEDs are used to make the light rays co-parallel. These may be thin film optical Söller collimators.

Ultrasound

Figure 5:
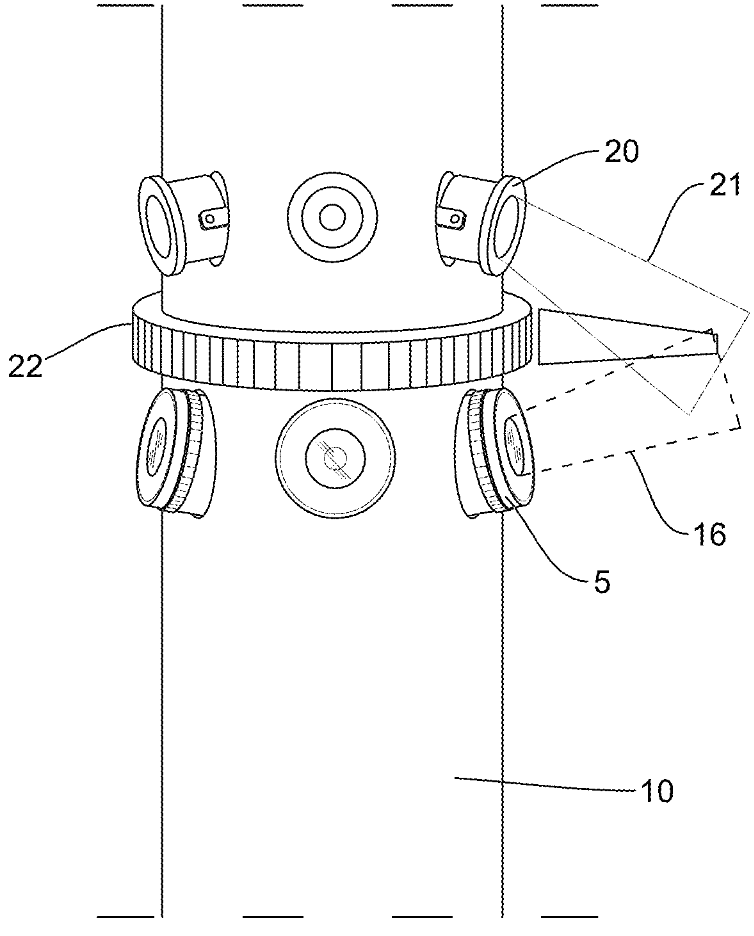
FIG. 5 is a side view of a tool having optical and ultrasound transducers arranged to overlap.

In another embodiment, the imaging tool comprises an ultrasound sensor 22 and imaging sensor 5 arranged to capture respective ultrasound and optical images of the same areas of the casing or wellbore. These redundant images overlap but provide different aspects of the target, such as depth features for ultrasound and surface features for optical images. FIG. 5 illustrates a phased array transducer 22 in a ring-shaped arrangement and plural cameras, but other arrangements would work. This arrangement uses known transducer arrays for simplicity, although as shown the ultrasound captures its frames as rings, while the optical sensor captures images as discreet 2D frames.

The processor co-registers the ultrasound and optical images then renders an improved 3D visualization for the user. Co-registration is simple when the two sensors are focused on the same area and capture frames at the same time. Adjustments can be made by identifying and registering the same feature (e.g. perforations, cracks, and collars) in both ultrasound and optical images then shifting their pixels accordingly. The ultrasound data provides data about the distance from the sensor to the inner and outer surface, ovality, cracks and voids while the camera provides surface texture and possible color. Thus, a geometric model can be derived from the ultrasound data, and then its inner surface may be re-rendered using the cameras' data. Thus, geometric distortions in the optical image can be corrected and subtle surface features like rust or chemical buildup be understood by eye.

Figure 14:
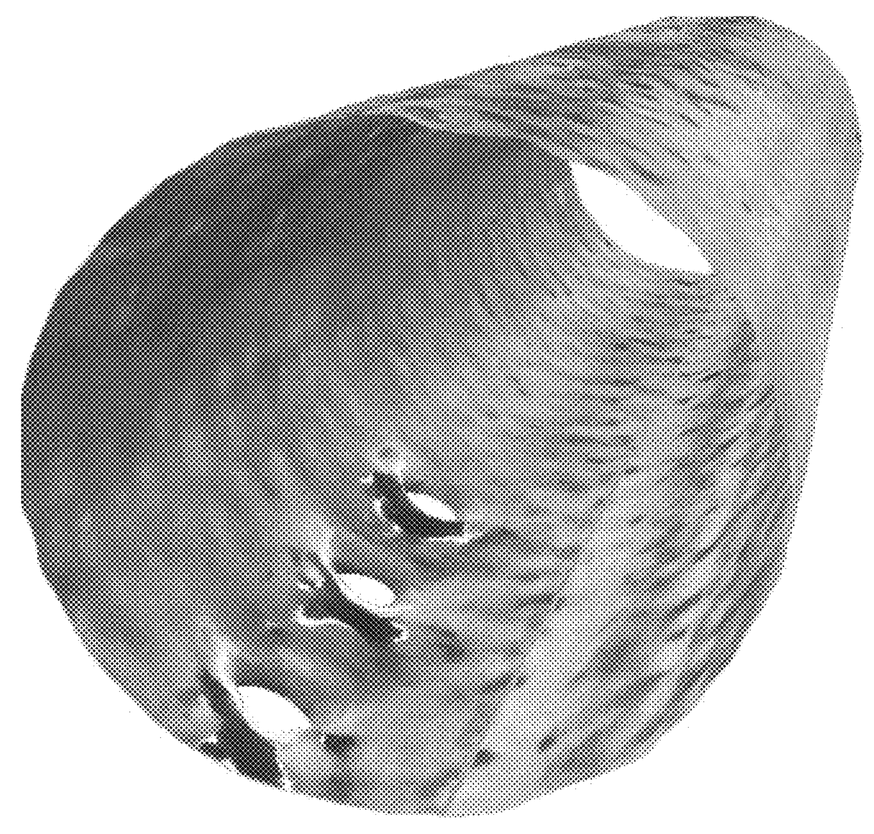
FIG. 14 is a rendering of a tubular shown with depth contours (top) and surface texture (bottom).
Figure 14:

FIG. 14 each show two rendering options for a casing: contours (top) or surface texture (bottom). The ultrasound images (top) pick up geometric contours and depth features. The bottom renderings show this same section of casing combining the ultrasound depth features and optical surface features (e.g. corrosion, rust, and color data). These may be implemented by creating an .obj file for ultrasound pixels and .png texture file for camera pixels, which are combinable by common 3D Viewers.

A graphic user interface (GUI) displaying these rendering may have caliper and inspection functions that allow the user to click on a pixel or between pixels to receive a computation of geometric properties. In the zoomed-in renderings of FIG. 15, the user can clearly and precisely select pixels and features for inspection, such as the perforations and rust shown.

Stereoscopic Imaging for Depth

Figure 7:
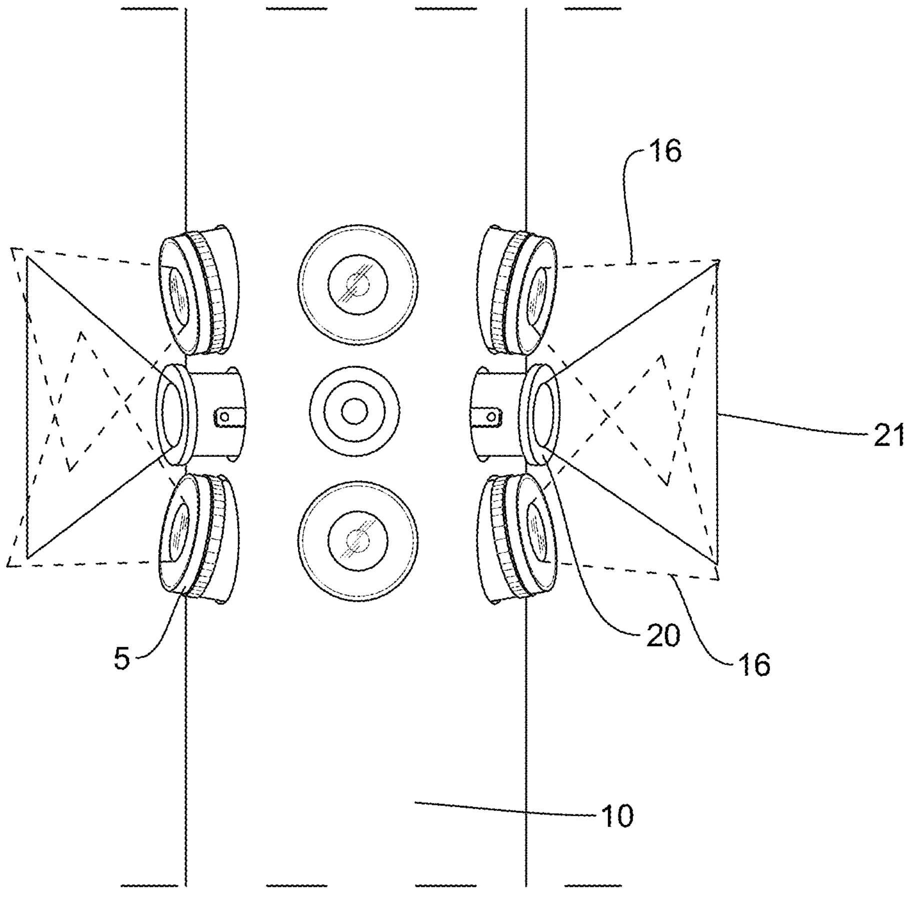
FIG. 7 is a side view of a stereoscopic camera arrangement with light source and overlapping fields of view and illumination.

As shown in FIG. 7, certain embodiments may arrange plural cameras, set at different perspectives towards overlapping FOVs of the tubular. As shown, there may be pairs of cameras, arranged axially above and below a lighting source and tilted towards the same area on the casing. There may be several pairs, whereby the pairs are radially distributed around the housing to capture a 360° view. Alternatively, the upper set of cameras might be azimuthally offset from the lower set.

Thus, the cameras image the same features but from different perspectives to capture some depth information and see features that may be obfuscated from one perspective. Imaging processors register images from two or more cameras and compares the perspectives to build a textured surface map. Those skilled in the art will appreciate how known image processing algorithms may achieve this for stereoscopic (or omniscopic) cameras.

FIG. 8 illustrates a complementary embodiment of FIG. 7, whereby two differing light sources provide each camera with perspective. The lights illuminate substantially overlapping area but from different perspectives and the camera is focused on that area too. The lights may differ in wavelength (i.e. color), timing, or pattern, which is captured by the camera and separated using image processing to extract surface contour data. For example, one light may be blue and another red, which lighting are captured by an RGB camera on separate color channels. When the channels are compared, there will be a slight shift for features due to depth and perspective of the corresponding light.

Plural pulsing light sources may be used to alternately illuminate an area from different perspectives, for example from above and below in the arrangement of FIG. 8. The imaging sensor is timed to capture one frame for each of the light sources 20. Image processing can be used to compare the frames for the same area. This allows the system to capture features and add perspectives, because edges or depth features will be captured in one frame more than another, leading to an inference that a feature is into or out of the plane of view. This depth is proportionate to the difference in apparent size of the feature captured in the first and second frame.

In the case of differing patterns, a first pattern (e.g. rectangular grid) and second pattern (e.g. polar grid) from the light sources are captured by the camera to find different distortions to each pattern caused by the surface contours.

In addition to the basic cameras and lighting components, memory, system sensors, controllers/processor, and a power supply are part of the inspection system and housed within the pressure vessel. The memory receives and stores the images streamed from the camera(s) and ultrasound (when present). The processor is programmed to time the capture of images, and control or time the lights. Additional system sensors may monitor the well pressure, temperature, depth, and wireline encoded distance.

The images are preferably processed offline using a computer with image processing software to compute contours, 3D geometries, stitch multiple images together, all to provide renderings as shown in FIG. 14.

Despite the problems raised with downhole camera tools, as cited in the background section, the skilled person is encouraged to read these to understand the engineering considerations for making and operating such a camera. The present tool preferably employs a pressure vessel, optical sensors, materials, optical signal electronics, and light emitters similar to those known in the art. These basic elements are then modified and arranged as described above.

Each of the above improvements provide a novel aspect over existing downhole camera tools. They may also be combined for further improvement. Examples of such combinations follow to illustrate their utility, but the skilled person will appreciate that one could combine aspects in other ways. For example, an imaging tool may employ stereo cameras, each using a telecentric lens, in order to capture the tubular which is illuminated by a laser pattern(s), which is redundantly captured by an overlapping ultrasound transducer. Tools may comprise a combination of radial and axial cameras.

The skilled person will appreciate that the novel aspects disclosed above will be implemented in a tool using engineering consideration normal for downhole operations. These typically include a pressure housing (preferably with vacuum layer for heat protection), electronics to drive the cameras and lights, storage for the captured images, and centralizers to keep the tool at the center of the tubular. External to the tool there may be a wireline 17 or tractor to move the tool through the tubular continuously. There will also be a remote computing station 19 to receive the captured image, perform image processing on the multiple images to register and correct images for rendering to a display.

Terms such as “top”, “bottom”, “distal”, “proximate” “downhole”, “uphole”, “below,” “above,” “upper, downstream,” are used herein for simplicity in describing relative positioning of elements of the conduit or device, as depicted in the drawings or with reference to the surface datum. Although the present invention has been described and illustrated with respect to preferred embodiments and preferred uses thereof, it is not to be so limited since modifications, combination and changes can be made therein which as understood by those skilled in the art.

The invention claimed is:

1. A downhole imaging system comprising:

a) an imaging device having:
  illumination;
  a phased array ultrasound sensor; and
  an optical imaging sensor,
    wherein the ultrasound and optical imaging sensor are arranged to focus laterally outward from a housing;
b) one or more memories for storing images from the phased array ultrasound sensor and the optical imaging sensor; and
c) a computer processor and computer instructions for co-registering the images from the optical and phased array ultrasound sensors.

2. The downhole imaging system of claim 1, wherein the optical imaging sensor and phased array ultrasound sensor are longitudinally spaced-apart along the tool.

3. The downhole imaging system of claim 1, wherein the phased array ultrasound sensor is ring-shaped and the optical imaging sensor comprises multiple cameras spread azimuthally around the housing.

4. The downhole imaging system of claim 1, wherein the phased array ultrasound sensor and optical imaging sensor are arranged to capture same areas of a wellbore, such that the optical and ultrasound images overlap.

5. The downhole imaging system of claim 1, wherein the optical imaging sensor and phased array ultrasound sensor capture different aspects of the wellbore.

6. The downhole imaging system of claim 5, wherein the phased array ultrasound sensor is arranged to capture depth features of the wellbore and the optical imaging sensor is arranged to capture surface features of the wellbore.

7. A method for imaging a wellbore comprising:

imaging said wellbore using an optical imaging sensor and illumination;

imaging said wellbore using a phased array ultrasound sensor;

receiving and storing optical images and ultrasound images;

co-registering the optical images with the ultrasound images; and rendering a 3D visualization of said wellbore using the co-registered optical images and ultrasound images.

8. The method of claim 7, wherein rendering the 3D visualization includes optical images and ultrasound images co-registered at a same section of the wellbore.

9. The method of claim 7, wherein the 3D visualization combines depth features from the ultrasound images and surface features from the optical images.

10. The method of claim 7, wherein the phased array ultrasound sensor is ring-shaped and receiving ultrasound images comprises capturing a frame from a cross-section of a casing of the wellbore.

11. The method of claim 7, wherein the optical imaging sensor comprises plural cameras and receiving optical images comprises capturing discreet 2D frames from the plural cameras, the method further comprising stitching together the discreet 2D frames for rendering the 3D visualization.

12. The method of claim 7, wherein co-registering further comprises identifying and registering same features of the wellbore in both ultrasound and optical images.

13. The method of claim 12, wherein rendering comprises shifting pixels in the ultrasound or optical images according to the identified and registered features.

14. The method of claim 12, further comprising measuring the identified and registered features.

15. The method of claim 12, further comprising displaying the rendered 3D visualization on a graphic user interface (GUI), which GUI has caliper and inspection functions that allow a user to click on a pixel or between pixels, the method further comprising computing geometric properties, contours, or a diameter of a perforation at the clicked pixel or between clicked pixels.

16. The method of claim 7, wherein rendering uses the ultrasound images to determine geometry of a casing of the wellbore from the distance from the phased array ultrasound sensor to the inner and outer surface of the casing.

17. The method of claim 7, wherein the 3D visualization is rendered from ultrasound images to display cracks or voids in a casing of the wellbore.

18. The method of claim 7, wherein the 3D visualization is rendered from optical images to display surface texture or color of the wellbore.

19. The method of claim 7, wherein co-registering further comprises correcting geometric distortions in the optical images using the ultrasound images.

20. The method of claim 7, wherein co-registering comprises identifying same features in both ultrasound and optical images, then shifting pixels in the images accordingly, preferably wherein the features identified include perforations, cracks, and collars.

21. A downhole imaging system comprising:

a) an imaging device having:
   illumination;
   a phased array ultrasound sensor; and
   an optical imaging sensor, wherein the ultrasound and optical imaging sensor are arranged to focus laterally outward from a housing;
b) one or more memories for storing images from the phased array ultrasound sensor and the optical imaging sensor; and
c) a computer processor and computer instructions for co-registering the images from the optical and phased array ultrasound sensors,
   wherein the phased array ultrasound sensor and optical imaging sensor are arranged to capture same areas of a wellbore, such that the optical and ultrasound images overlap.

* * * * *